(12) United States Patent
Hong et al.

(10) Patent No.: US 10,511,043 B2
(45) Date of Patent: Dec. 17, 2019

(54) GAS DIFFUSION LAYER FOR FUEL CELL APPLICATIONS

(75) Inventors: Bo Ki Hong, Seoul (KR); Kook Il Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 819 days.

(21) Appl. No.: 12/703,423

(22) Filed: Feb. 10, 2010

(65) Prior Publication Data

US 2011/0136044 A1   Jun. 9, 2011

(30) Foreign Application Priority Data

Dec. 3, 2009   (KR) .................. 10-2009-0119314

(51) Int. Cl.
*H01M 8/1007* (2016.01)
*H01M 8/0234* (2016.01)
*H01M 8/1018* (2016.01)
*H01M 8/0243* (2016.01)

(52) U.S. Cl.
CPC ....... *H01M 8/1007* (2016.02); *H01M 8/0234* (2013.01); *H01M 8/0243* (2013.01); *H01M 2008/1095* (2013.01); *Y02P 70/56* (2015.11)

(58) Field of Classification Search
USPC ....... 429/456, 457, 452, 463, 467, 471, 507, 429/523, 535
See application file for complete search history.

(56) References Cited

U.S. PATENT DOCUMENTS

| | | | |
|---|---|---|---|
| 3,971,669 A | * | 7/1976 | Wrzesien et al. ............. 156/181 |
| 5,248,573 A | * | 9/1993 | Arkens et al. ................ 429/250 |
| 7,455,928 B2 | | 11/2008 | Mathias et al. |
| 2001/0041281 A1 | * | 11/2001 | Wilkinson et al. ............. 429/34 |
| 2002/0051901 A1 | * | 5/2002 | Zuber et al. .................... 429/32 |
| 2005/0042500 A1 | * | 2/2005 | Mathias ............. H01M 8/0232 429/483 |

(Continued)

FOREIGN PATENT DOCUMENTS

| | | |
|---|---|---|
| CN | 1988225 A | 6/2007 |
| JP | 3331703 B2 | 10/2002 |
| JP | 2005203314 A | 7/2005 |

(Continued)

OTHER PUBLICATIONS

Machine Translation of JP2006222024A2.*

(Continued)

*Primary Examiner* — Benjamin M Kurtz
(74) *Attorney, Agent, or Firm* — Mintz Levin Cohn Ferris Glovsky and Popeo, P.C.; Peter F. Corless

(57) ABSTRACT

A gas diffusion layer (GDL) for fuel cell applications that can prevented channels of a bipolar plate from being intruded. The gas diffusion layer is manufactured by cutting a GDL material at a certain angle such that a machine direction of the inherent high stiffness of the GDL material is not in parallel with a major flow field direction of a bipolar plate to prevent the GDL intrusion into the channels of the bipolar plate without modifying an existing method for manufacturing the gas diffusion layer. With the gas diffusion layer, the electrochemical performance of the fuel cell can be improved and manufacturing process can be improved even in the case where the width of the rolled GDL material is small.

8 Claims, 11 Drawing Sheets

(56) References Cited

U.S. PATENT DOCUMENTS

2007/0148526 A1* 6/2007 Farrington et al. ............ 429/38
2008/0113243 A1 5/2008 Kawashima et al.

FOREIGN PATENT DOCUMENTS

| JP | 2005-285757 A | | 10/2005 |
| JP | 2006-107926 A | | 4/2006 |
| JP | 2006222024 A2 | * | 8/2006 |
| JP | 2008-004500 A | | 1/2008 |
| KR | 10-2009-0068262 | | 6/2009 |
| KR | 10-2011-0062552 A | | 6/2011 |
| WO | WO 9713287 A2 | * | 4/1997 |

OTHER PUBLICATIONS

Mallick, 2007, Fiber-reinforced composites Materials 3$^{rd}$ Edition, Manufacturing and Design, Department of Mechanical Engineering, University of Michigan—Dearbor, Chapter 2.*

Chapter 7, Advanced Composite Materials, pp. 1-58, Access Jul. 30, 2015 online.*

Cindrella et al., "Gas diffusion layer for proton exchange membrane fuel cells—A review", Journal of Power Sources, pp. 1-15 (2009).

Park et al., "Effect of PTFE content in microporous layer on water management in PEM fuel cells", J. of Power Sources, vol. 177, pp. 457-463 (2008).

Wang et al., "Micro-porous layer with composite carbon black for PEM fuel cells", Electochimica Acta, vol. 51, pp. 4909-4915 (2006).

Mathias et al., "Diffusion media materials and characterization", Handbook of Fuel Cells—Fundamentals, Technology and Applications, vol. 3, Ch. 42, Jogn Wiley & Sons (2010).

Lai et al., "Channel intrusion of gas diffusion media and the effect on fuel cell performance", J. of Power Sources, vol. 184, pp. 120-128 (2008).

Kleeman et al., "Characterization of mechanical behaviour and coupled electrical properties of polymer electrolyte membrane fuel cell gas diffusion layers", J. of Power Sources, vol. 190, pp. 92-102 (2009).

* cited by examiner

GAS DIFFUSION LAYER FOR FUEL CELL APPLICATIONS

CROSS-REFERENCE TO RELATED APPLICATION

This application claims under 35 U.S.C. § 119(a) the benefit of Korean Patent Application No. 10-2009-0119314 filed Dec. 3, 2009, the entire contents of which are incorporated herein by reference.

BACKGROUND (a) Technical Field

The present disclosure relates to a gas diffusion layer (GDL) for fuel cell applications, which functions to discharge water as a product of an electrochemical reaction in a fuel cell stack and transfer electrons.

(b) Background Art

In general, a polymer electrolyte membrane fuel cell (PEMFC) is used as a fuel cell for a vehicle. The PEMFC should be able to stably operate over a wide current density range such that it normally exhibits a high-power performance of at least several tens of kW under various operational conditions of the vehicle [S. Park, J. Lee, and B. N. Popov, J. Power Sources, 177, 457 (2008)].

The fuel cell generates electricity through an electrochemical reaction between hydrogen and oxygen. Hydrogen supplied to an anode as an oxidation electrode of the fuel cell is dissociated into hydrogen ions and electrons. The hydrogen ions are transmitted to a cathode as a reduction electrode through a polymer electrolyte membrane, and the electrons are transmitted to the cathode through an external circuit. At the cathode, the hydrogen ions and electrons react with oxygen containing air to generate electricity and heat and, at the same time, produce water as a reaction by-product.

When an appropriate amount of water produced during the electrochemical reaction is present in the fuel cell, it performs the function of maintaining the humidity of a membrane electrode assembly (100). However, when an excessive amount of water is present and is not appropriately removed, a flooding phenomenon occurs at high current density, and the flooding water prevents the reactant gases from being efficiently supplied to the fuel cell, which results in an increase in the voltage loss.

Here, the functions of the gas diffusion layer included in the fuel cell will be described in more detail.

FIG. 1 is a schematic diagram showing the structure of a unit cell including gas diffusion layers.

The gas diffusion layer is attached to the outer surface of each of catalyst layers coated on both sides of a polymer electrolyte membrane of the unit cell for an oxidation electrode and a reduction electrode. The gas diffusion layers function to supply reactant gases such as hydrogen and air (oxygen), transfer electrons produced by the electrochemical reaction, and discharge water produced by the reaction to minimize the flooding phenomenon in the fuel cell.

Typically, a commercially available gas diffusion layer has a dual layer structure including a microporous layer (MPL) having a pore size of less than 1 μm when measured by mercury intrusion and a macroporous substrate (or backing) having a pore size of 1 to 300 μm [X. L. Wang, H. M. Zhang, J. L. Zhang, H. F. Xu, Z. Q. Tian, J. Chen, H. X. Zhong, Y. M. Liang, B. L. Yi, Electrochimica Acta, 51, 4909 (2006)].

The microporous layer of the gas diffusion layer is formed by mixing carbon powder such as acetylene black carbon and black pearl carbon with a hydrophobic agent such as polytetrafluoroethylene (PTFE) and coating the mixture on one or both sides of the macroporous substrate.

Meanwhile, the macroporous substrate of the gas diffusion layer is generally composed of carbon fiber and a hydrophobic agent such as PTFE and may be formed of carbon fiber cloth, carbon fiber felt, or carbon fiber paper [S. Escribano, J. Blachot, J. Etheve, A. Morin, R. Mosdale, J. Power Sources, 156, 8 (2006); M. F. Mathias, J. Roth, J. Fleming, and W. Lehnert, Handbook of Fuel Cells-Fundamentals, Technology and Applications, Vol. 3, Ch. 42, John Wiley & Sons (2003)].

It is necessary to optimize the structural design of the gas diffusion layer for fuel cell applications such that the gas diffusion layer provides appropriate performance according to its application fields and operational conditions. In general, in the formation of the gas diffusion layer for fuel cell applications, the carbon fiber felt or carbon fiber paper is preferred to the carbon fiber cloth since the carbon fiber felt and carbon fiber paper have excellent properties such as reactant gas supply properties, product water discharge properties, compression properties, and handling properties.

Moreover, the gas diffusion layer has a significant effect on the performance of the fuel cell according to complex and various structural differences such as the thickness, gas permeability, compressibility, degree of hydrophobicity, structure of carbon fiber, porosity/pore distribution, pore tortuosity, electrical resistance, and bending stiffness. Especially, it is known that there is a significant difference in the performance in the mass transport region (Japanese Patent No. 3331703 B2).

Recently, with the commercialization of the fuel cell, extensive research and development for the mass production of the gas diffusion layer as a core component of the fuel cell have continued to progress. The gas diffusion layer should provide excellent performance in the fuel cell and should have an appropriate level of stiffness to provide excellent handling properties when several hundreds of cells are assembled in the fuel cell stack. When the stiffness of the gas diffusion layer is very high in the roll direction of the GDL material, it is difficult to roll the GDL material for transport and storage, and thus the mass productivity is reduced. Moreover, according to the previous reports, when the stiffness of the gas diffusion layer is insufficient in the fuel cell, as shown in FIG. 2, the gas diffusion layer may intrude into flow field channels of a bipolar plate (or separator) during assembly of the fuel cell (which is called "GDL intrusion") [Mao Nitta, Tero Hottinen, Olli Himanen, Mikko Mikkola, J. Power Sources, 171, 26 (2007); Yeh-Hung Lai, Pinkhas A. Rapaport, Chunxin Ji, Vinod Kumar, J. Power Sources, 184, 120 (2008); J. Kleemann, F. Finsterwalder, W. Tillmetz, J. Power Sources, 190, 92 (2009); M. F. Mathias, J. Roth, M. K. Budinski, U.S. Pat. No. 7,455,928 B2; T. Kawashima, T. Osumi, M. Teranishi, T. Sukawa, US 2008/0113243 A1].

When the GDL intrusion into the flow field channels of the bipolar plate (200) occurs, the space required for transferring reactant gases and product water is reduced, and the contact resistance between the gas diffusion layer (106), the ribs or lands (204) of the bipolar plate, and the polymer electrolyte membrane electrode assembly (100) is increased, which causes a significant deterioration in the fuel cell performance.

Since the GDL intrusion phenomenon is closely related with the flow field structure of the bipolar plate, it is important to appropriately design the flow field structure and increase the mechanical properties of the gas diffusion layer such as bending stiffness so as to achieve excellent fuel cell performance.

Typically, the fuel cell bipolar plate is composed of a major flow field and a minor flow field, and it is necessary to prevent the gas diffusion layer from intruding into the channels in the major flow field direction. For this purpose, it is important to increase the stiffness of the gas diffusion layer oriented in the width (W) direction rather than the length (L) direction which is in parallel with the major flow field direction of the bipolar plate. Otherwise, when the gas diffusion layer having a low stiffness is oriented in the width direction of the major flow field of the bipolar plate as shown in FIG. 2, the GDL intrusion into the major flow field of the bipolar plate is increased.

In order to solve this phenomenon, it is possible to use the inherent anisotropic properties of the gas diffusion layer.

That is, in the gas diffusion layer formed of carbon fiber felt or carbon fiber paper as a support, a greater amount of carbon fibers is oriented in the machine direction during the formation, and thus the gas diffusion layer in the machine direction has mechanical properties such as bending stiffness, tensile stress, etc. higher than those in the cross-machine direction (CMD) or transverse direction (TD).

Therefore, it is typical that the machine direction of the rolled GDL material is directed to the high stiffness direction and the cross-machine direction is directed to the low stiffness direction.

Conventionally, the gas diffusion layer is produced by intentionally arranging carbon fibers having a greater length or diameter in the cross-machine direction through a specific process or by introducing a metal reinforcing material to increase the stiffness of the gas diffusion layer in the width direction of the major flow field of the bipolar plate, thus preventing the gas diffusion layer from intruding into the channels (202) of the bipolar plate. Moreover, the gas diffusion layer is produced by arranging carbon fibers having a smaller length or diameter in the machine direction to facilitate the rolling of the GDL material to achieve the flexibility required for the rolling [M. F. Mathias, J. Roth, M. K. Budinski, U.S. Pat. No. 7,455,928 B2].

However, this method has problems that it is necessary to modify the method by adding a complicated process to the typical method for manufacturing the gas diffusion layer and, especially, when a different kind of metal reinforcing material is introduced, it may cause a variety of problems such as poor miscibility with the gas diffusion layer, non-uniform quality, etc.

According to another prior art method for preventing the GDL intrusion using anisotropic properties of carbon fiber woven cloth, the physical properties and handling properties of the cloth are insufficient, and thus it is difficult to use this method to manufacture the gas diffusion layer for fuel cell applications. [T. Kawashima, T. Osumi, M. Teranishi, T. Sukawa, US 2008/0113243 A1].

Accordingly, the previously proposed methods for preventing the GDL intrusion into the flow field channels of the bipolar plate are generally disadvantageous in terms of mass productivity, which is required for the commercialization of fuel cell vehicles.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a gas diffusion layer (GDL) for fuel cell applications, which is manufactured by optimizing a process of cutting a GDL material into a size that is suitable for a fuel cell stack without modifying an existing method for manufacturing the gas diffusion layer. That is, the present invention provides a gas diffusion layer for fuel cell applications, which improves fuel cell performance by increasing the stiffness of the gas diffusion layer in a width direction perpendicular to a major flow field direction of a bipolar plate by cutting a GDL material at a certain angle such that a machine direction of the inherent high stiffness of the GDL material is not in parallel with the major flow field direction of the bipolar plate to prevent the gas diffusion layer from intruding into channels of the bipolar plate.

In one aspect, the present invention provides a gas diffusion layer (GDL) for fuel cell applications, the gas diffusion layer having a dual layer structure including a microporous layer and a macroporous substrate, in which the stiffness in a width direction perpendicular to a major flow field direction of a bipolar plate is increased by cutting a rolled gas diffusion layer (GDL) material at a certain angle such that a machine direction of the inherent high stiffness of the GDL material is not in parallel with the major flow field direction of the bipolar plate to prevent the gas diffusion layer from intruding into flow field channels of the bipolar plate.

In a preferred embodiment, the gas diffusion layer may be manufactured by cutting the GDL material at an angle in a range of 0° to 90°, preferably 25° to 90°, formed by the machine direction of the inherent high stiffness of the GDL material and the major flow field direction of the bipolar plate.

In another preferred embodiment, the rolled GDL material in the machine direction may have a Taber bending stiffness in a range of 20 to 150 $g_f$·cm, preferably 50 to 100 $g_f$·cm.

In still another preferred embodiment, the macroporous substrate which constitutes the gas diffusion layer may be formed of at least one selected from the group consisting of carbon fiber felt and carbon fiber paper.

In yet another preferred embodiment, the gas diffusion layer may have a gas permeability of more than 0.5 $cm^3$/($cm^2$·s), preferably 2.5 $cm^3$/($cm^2$·s).

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, etc., and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
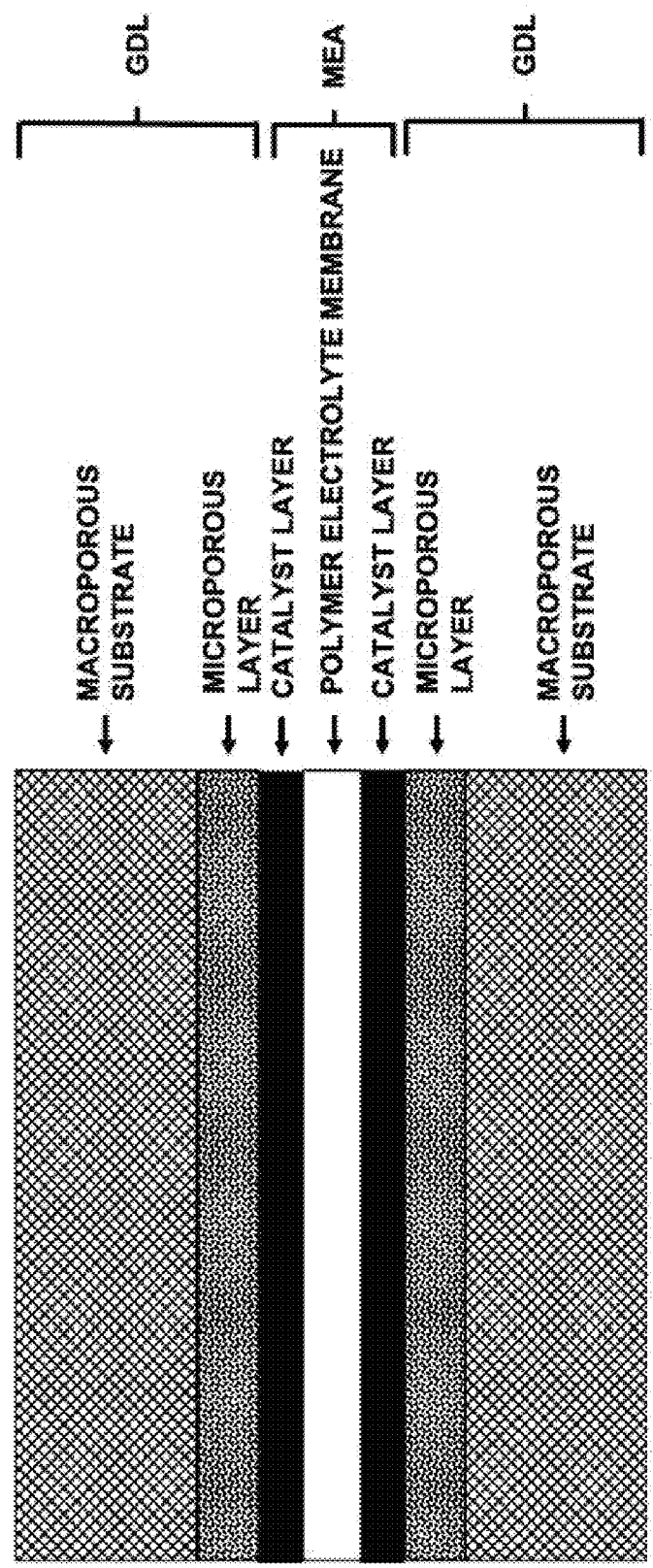
FIG. 1 is a schematic diagram showing the structure of a unit cell.
Figure 2:
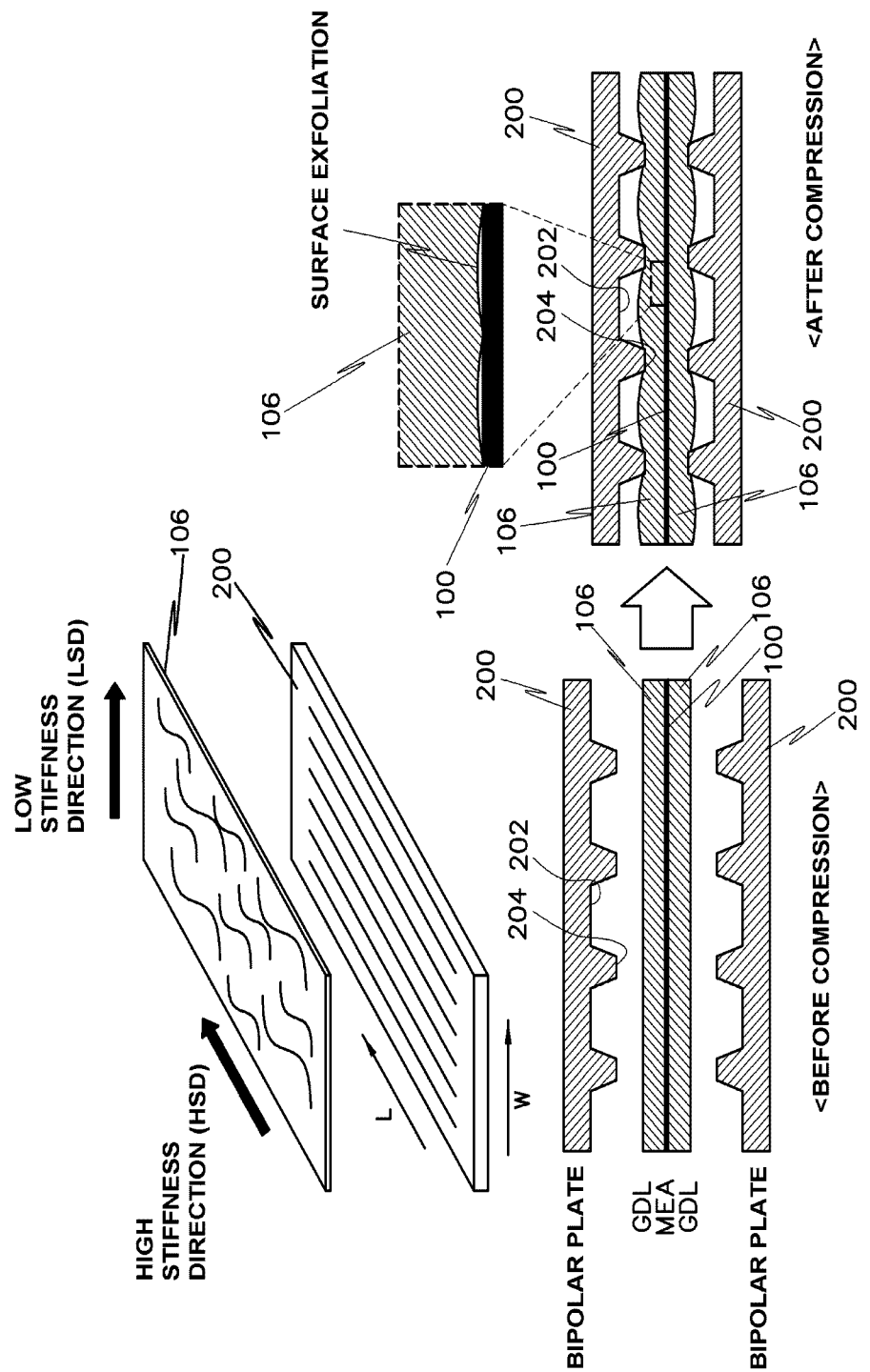
FIG. 2 is a schematic diagram showing a gas diffusion layer, which intrudes into major flow field channels of a bipolar plate by compression of bipolar plate ribs during assembly of a fuel cell.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a gas diffusion layer for fuel cell applications, which has a dual layer structure including a microporous layer and a macroporous substrate and is prevented from intruding into flow field channels of a bipolar plate, thereby providing excellent properties such as reactant gas supply properties, product water discharge properties, electron transfer properties, etc.

In detail, the present invention provides a gas diffusion layer for fuel cell applications, which has a dual layer structure including a microporous layer and a macroporous substrate, in which a GDL material is cut at a certain angle such that a machine direction of the inherent high stiffness of a rolled GDL material is not in parallel with a major flow field direction of a bipolar plate without modifying an existing method for manufacturing the gas diffusion layer, thereby preventing the gas diffusion layer from intruding into flow field channels of the bipolar plate.

The gas diffusion layer of the present invention is manufactured by cutting a GDL material at an angle in a range of 0° to 90°, preferably 25° to 90°, formed by the machine direction of the inherent high stiffness of the GDL material and the major flow field direction of the bipolar plate. Here, the Taber bending stiffness of the rolled GDL material in the machine direction (i.e., high stiffness direction) is in a range of 20 to 150 $g_f$·cm, preferably 50 to 100 $g_f$·cm. The reason for this is that if the Taber bending stiffness is less than 20 $g_f$·cm, the stiffness is too small to be used as the gas diffusion layer for fuel cell applications, whereas, if it is more than 150 $g_f$·cm, the GDL material becomes too rigid, which makes it difficult to roll the GDL material, thereby reducing the mass productivity.

Moreover, the gas diffusion layer of the present invention has a gas permeability of more than 0.5 $cm^3/(cm^2·s)$, preferably 2.5 $cm^3/(cm^2·s)$. The reason for this is that if the gas permeability is less than 0.5 $cm^3/(cm^2·s)$, the material transfer properties of the gas diffusion layer is significantly reduced.

Meanwhile, the macroporous substrate which constitutes the gas diffusion layer may be formed of at least one selected from the group consisting of carbon fiber felt and carbon fiber paper.

EXAMPLES

The following examples illustrate the invention and are not intended to limit the same.

Figure 6:
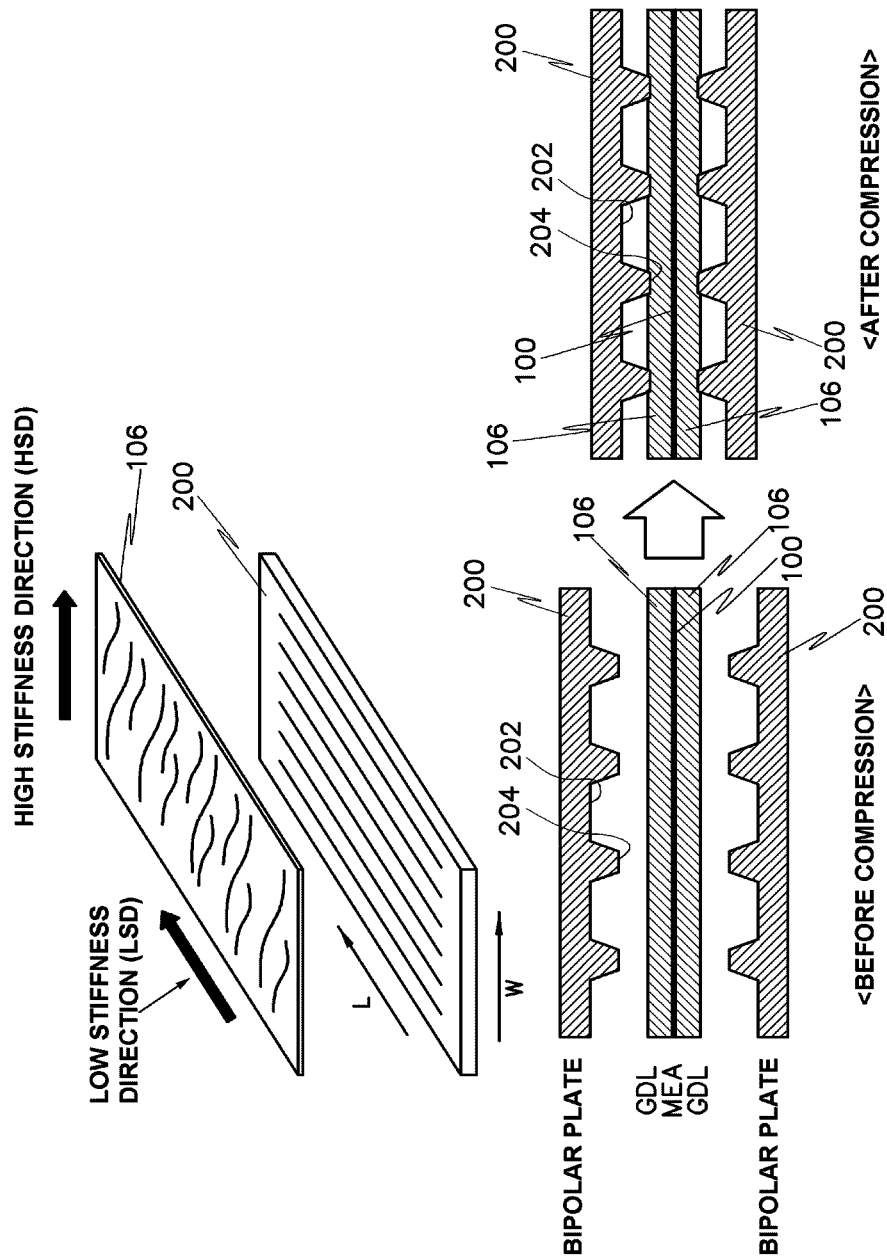
FIG. 6 is a schematic diagram showing a gas diffusion layer applied to a fuel cell in accordance with the present invention.

In Examples 1 and 2 of the present invention, gas diffusion layers were manufactured by cutting a GDL material produced by a prior art method at a certain angle to increase the stiffness of the gas diffusion layer in the width (W) direction perpendicular to the major flow field direction of the bipolar plate as shown in FIG. 6.

Conventionally, the GDL material is cut such that the high stiffness of the GDL material in the machine direction is in the length (L) direction which is in parallel with the major flow field direction of the bipolar plate (cutting angle: 0°). However, in the present invention, the GDL material was cut at an angle of 90° such that the high stiffness of the GDL material in the machine direction is in the width direction of the major flow field of the bipolar plate, thereby increasing the stiffness of the gas diffusion layer in the width direction of the major flow field.

Two kinds of gas diffusion layers (GDL-1 and GDL-2) formed of carbon fiber felt were used in Examples 1 and 2 of the present invention, and their basic properties are shown in the following table 1.

TABLE 1

| Physical properties | Measurement conditions | Units | GDL-1 | GDL-2 |
|---|---|---|---|---|
| Thickness | 25 kPa | μm | 454 | 302 |
| Taber bending stiffness | Stiffness tester: 150-E V-5* Measurement angle: 15° | $g_f \cdot cm$ | MD: 65 CMD: 11 | MD: 27 CMD: 2 |
| Gas permeability | Gurley | $cm^3/(cm^2 \cdot s)$ | 37 | 0.7 |

*Taber Industries, USA

In Example 3 of the present invention, GDL-1 was cut at angles of 45°, 60°, and 90° to compare the effect of improving the fuel cell performance.

COMPARATIVE EXAMPLES

Figure 3:
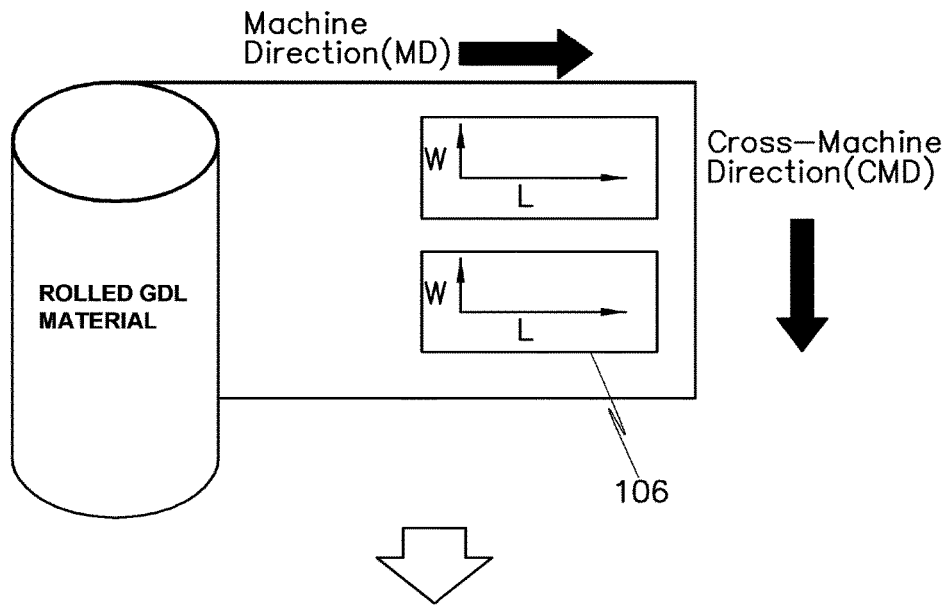
FIG. 3 is a diagram comparing a prior art method for manufacturing a gas diffusion layer and a method for manufacturing a gas diffusion layer in accordance with the present invention.
Figure 3:
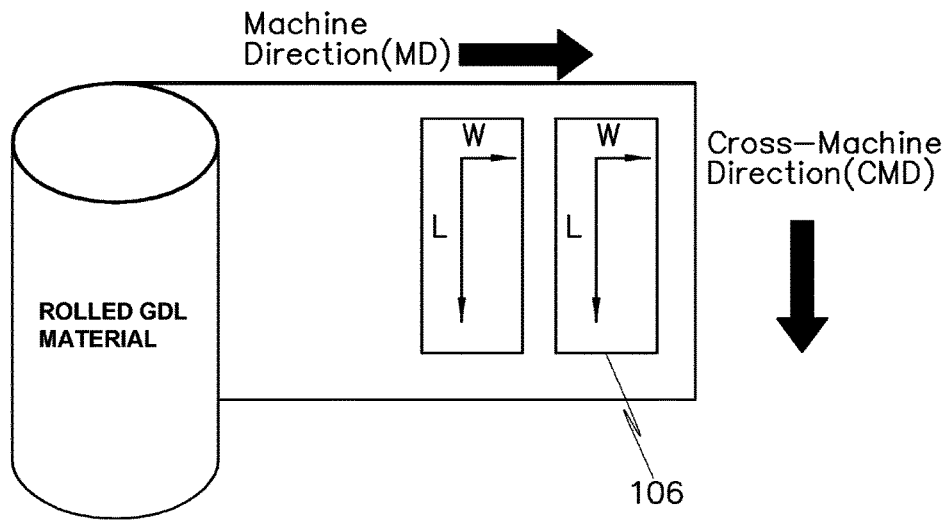
Figure 4:
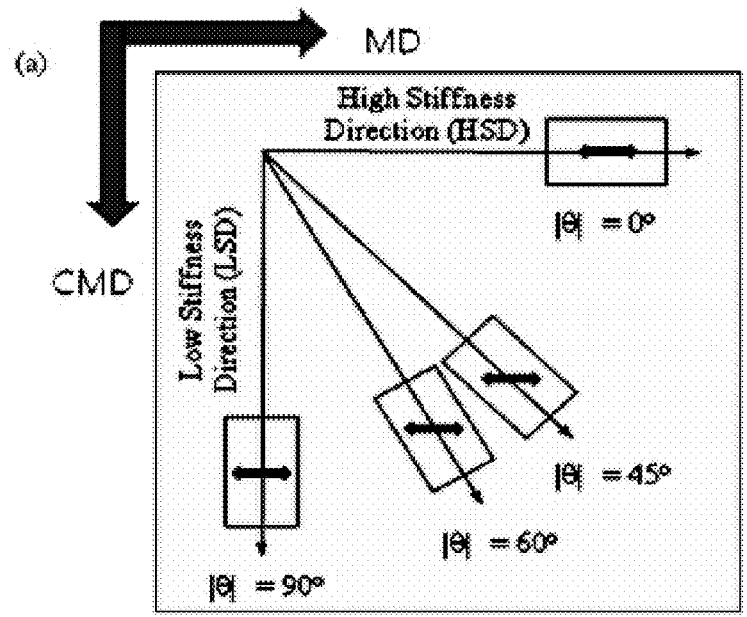
FIG. 4 is a schematic diagram showing the arrangement between a major flow field direction of a bipolar plate and a high stiffness direction of a gas diffusion layer during cutting at different angles according to a method of the present invention, in which (a) shows a process of cutting a rolled GDL material at different angles with respect to the high stiffness of the GDL material (cut at an angle of 0°) in a machine direction and (b) shows the arrangement between the high stiffness direction of a new gas diffusion layer and the major flow field direction of the bipolar plate.
Figure 4:
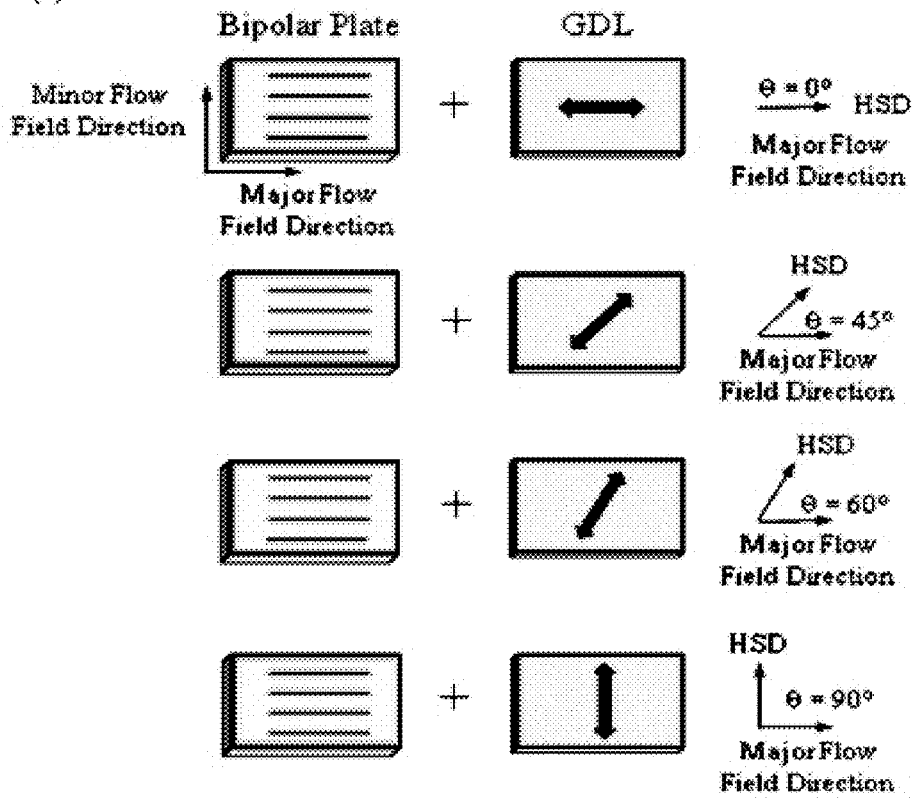
Figure 5:
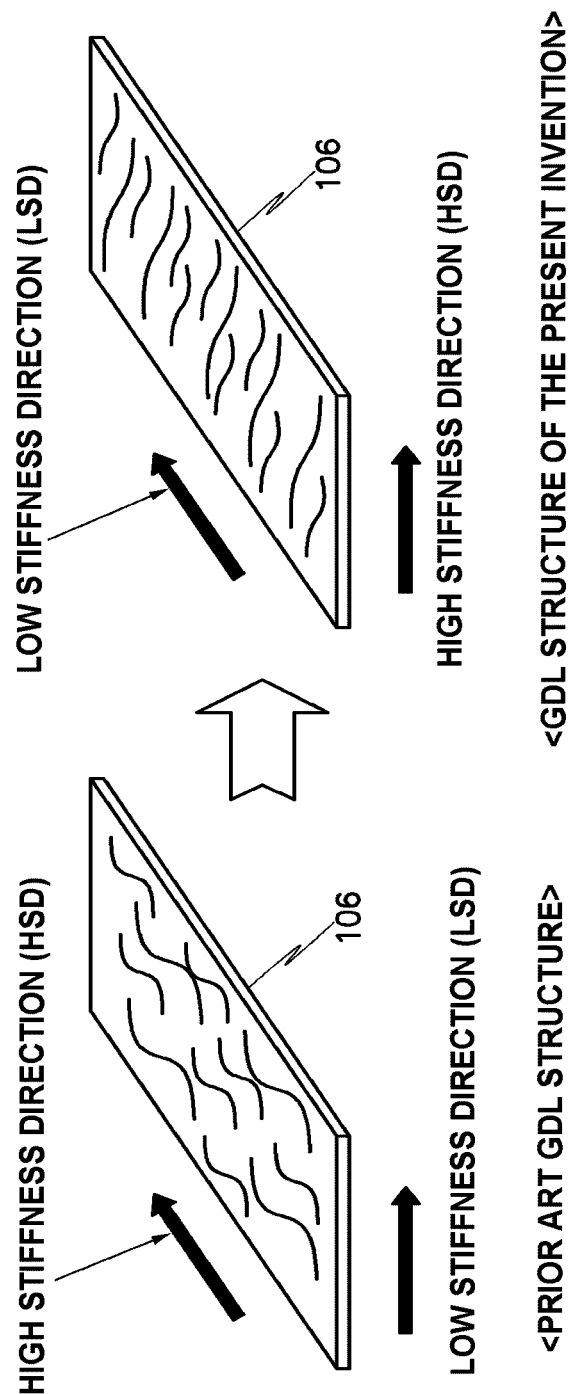
FIG. 5 is a schematic diagram comparing the structure of a prior art gas diffusion layer (cut at an angle of 0°) and a gas diffusion layer (cut at an angle of 90°) of the present invention.

As shown in FIGS. 3 and 4, in Comparative Examples, the GDL material in the machine direction was cut in the length (L) direction which is in parallel with the major flow field direction of the bipolar plate (cutting angle: 0°).

In order to evaluate the electrochemical performances of the gas diffusion layers according to the Examples and Comparative Examples, various elements such as polymer electrolyte membranes, catalyst layers, connection devices, etc. were assembled and maintained in the same way.

Two kinds of bipolar plates (BP-1 and BP-2) having substantially the same structure were used, in which BP-1 was used in Examples 1 and 2 and Comparative Examples 1 and 2 and BP-2 was used in Example 3 and Comparative Example 3.

Moreover, the electrochemical performances of the gas diffusion layers according to the Examples and Comparative Examples were evaluated by measuring and comparing cell potential-current density polarization characteristics with respect to a single-cell stack or a 5-cell stack using commercially available equipment.

The conditions during the measurement of the electrochemical performances of the fuel cell stacks having the gas diffusion layers according to the Examples and Comparative Examples were as follows:

Temperature at the inlet of the fuel cell stack: 65° C.;
Gas pressure: Near ambient pressure;
Relative humidity (RH) at the anode and cathode: 100%/100% or 50%/50%; and
Stoichiometric ratio (SR) at the anode and cathode: 1.5/2.0.

Under the above conditions, the evaluation of the electrochemical performances of the fuel cell stacks having the gas diffusion layers according to the Examples and Comparative Examples was performed in the following manner.

Figure 7:
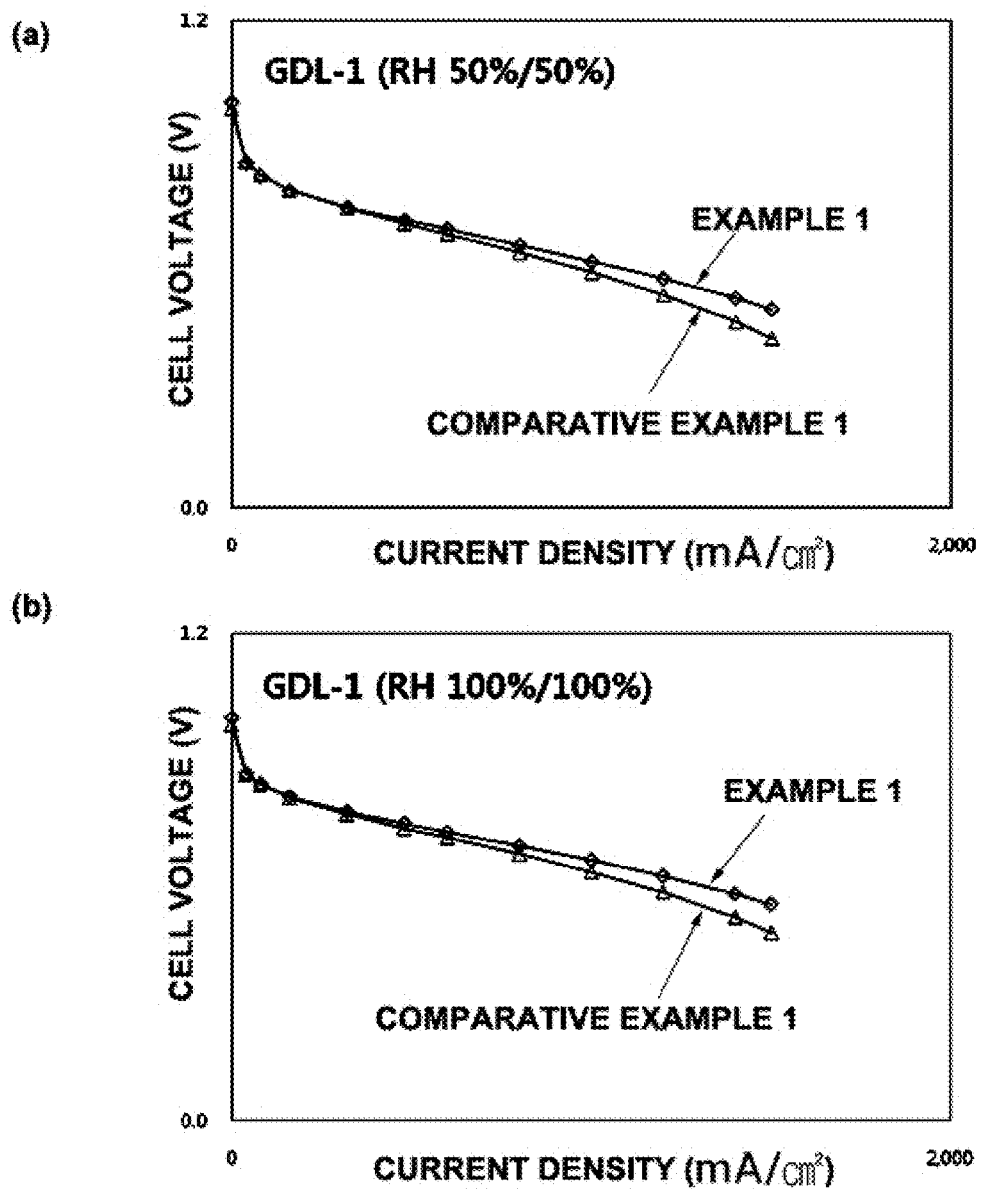
FIG. 7 is a graph showing the electrochemical performances of 5-cell stacks (BP-1) having gas diffusion layers (GDL-1) cut at angles of 0° and 90°, in which (a) was measured at a relative humidity of 50%/50% and (b) was measured at a relative humidity of 100%/100%.
Figure 8:
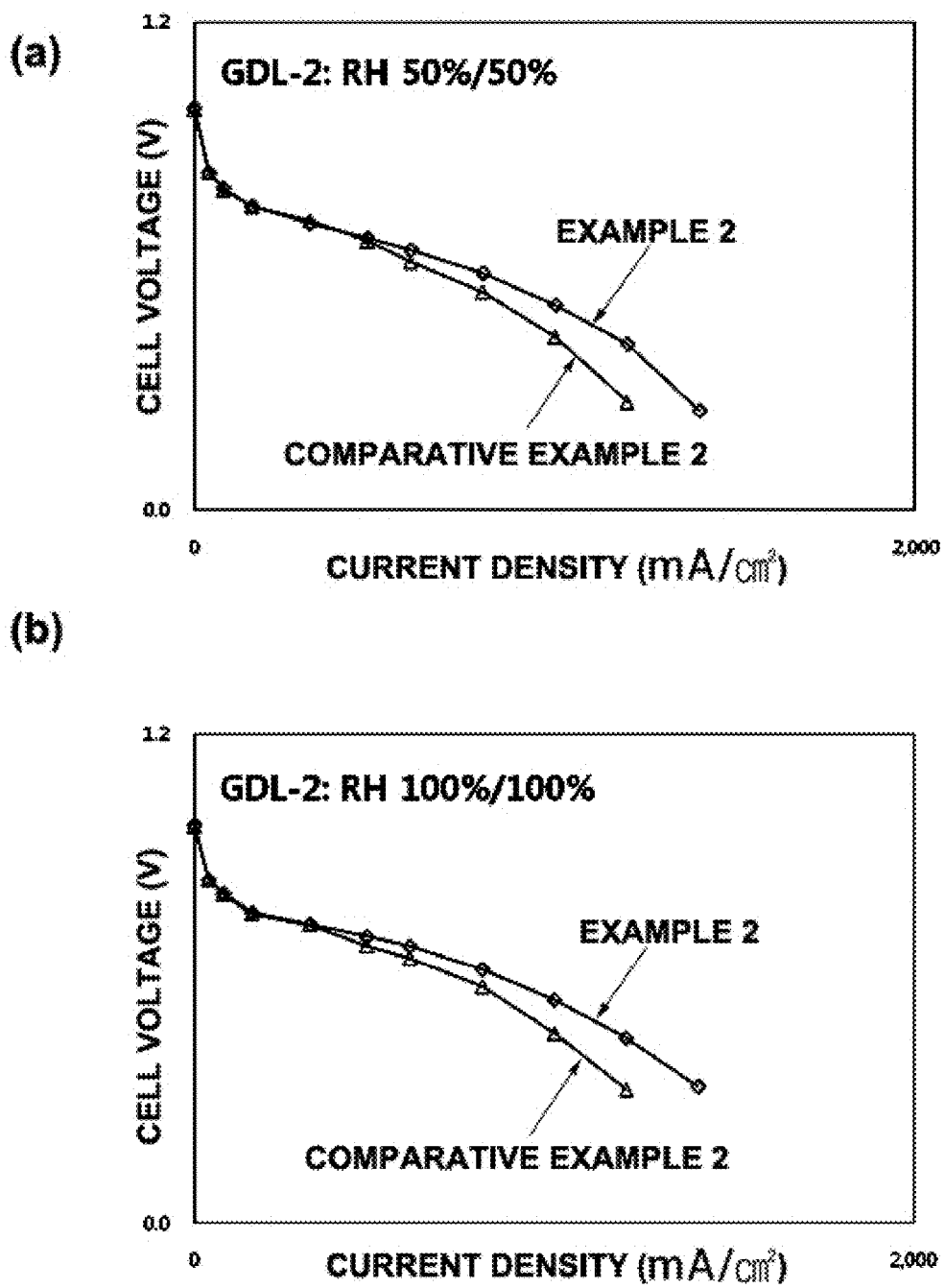
FIG. 8 is a graph showing the electrochemical performances of single-cell stacks (BP-1) having gas diffusion layers (GDL-2) cut at angles of 0° and 90°, in which (a) was measured at a relative humidity of 50%150% and (b) was measured at a relative humidity of 100%/100%.

At the relative humidity of 100%/100% or 50%/50%, the electrochemical performances of the gas diffusion layers according to Examples 1 and 2 of the present invention and those of the gas diffusion layers according to Comparative Examples 1 and 2 were compared under standard operating conditions, and the results are shown in FIGS. 7 and 8.

As shown in FIGS. 7 and 8, it can be seen that the electrochemical performances of the fuel cell stacks having the gas diffusion layers cut at an angle of 90° in accordance with the present invention were higher than those of the fuel cell stacks having the gas diffusion layers cut at an angle of 0° in accordance with the prior art.

That is, in the case of GDL-1, as shown in FIG. 7, it can be seen that at relative humidities of 50%/50% and 100%/100%, the current density of the gas diffusion layer cut at an angle of 90° according to Example 1 of the present invention measured at 0.6 V was increased about 12% and 15%, respectively, compared to the gas diffusion layer cut at an angle of 0° according to Comparative Example 1.

Moreover, in the case of GDL-2, as shown in FIG. 8, it can be seen that at relative humidities of 50%/50% and 100%/100%, the current density of the gas diffusion layer cut at an angle of 90° according to Example 2 of the present invention measured at 0.6 V was increased about 18% and 16%, respectively, compared to the gas diffusion layer cut at an angle of 0° according to Comparative Example 2.

As shown in FIG. 6, without intending to limit theory, it is believed that the reason for the improvement in the fuel cell performance is that the high stiffness direction of the gas diffusion layers was appropriately oriented in the width (W) direction perpendicular to the major flow field direction of the bipolar plate to prevent the GDL intrusion into the flow field channels of the bipolar plate.

Figure 9:
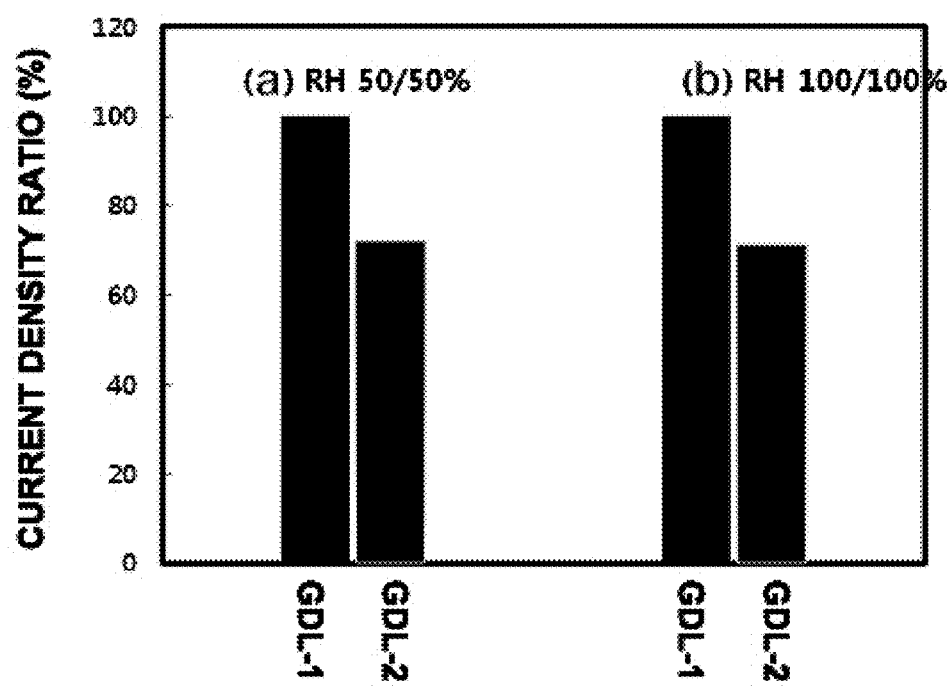
FIG. 9 is a graph showing the electrochemical performances (i.e., current density at 0.6 V) of fuel cell stacks (BP-1) having a gas diffusion layer (GDL-1) of the present invention and a gas diffusion layer (GDL-2), which were cut at an angle of 90°, in which (a) was measured at a relative humidity of 50%/50% and (b) was measured at a relative humidity of 100%/100%.

The electrochemical performances (i.e., current density at 0.6 V) of the fuel cell stacks having the gas diffusion layers GDL-1 and GDL-2 (cut at an angle of 90°) according to Examples 1 and 2 of the present invention were compared, and the results are shown in FIG. 9. As shown in the figure, it can be seen that the higher stiffness of the gas diffusion layer contributes to the improvement in the fuel cell performance since the fuel cell performance of GDL-2 having a relatively low bending stiffness was about 72% of the fuel cell performance of GDL-1 at all relative humidities of 50%/50% and 100%/100%.

Figure 10:
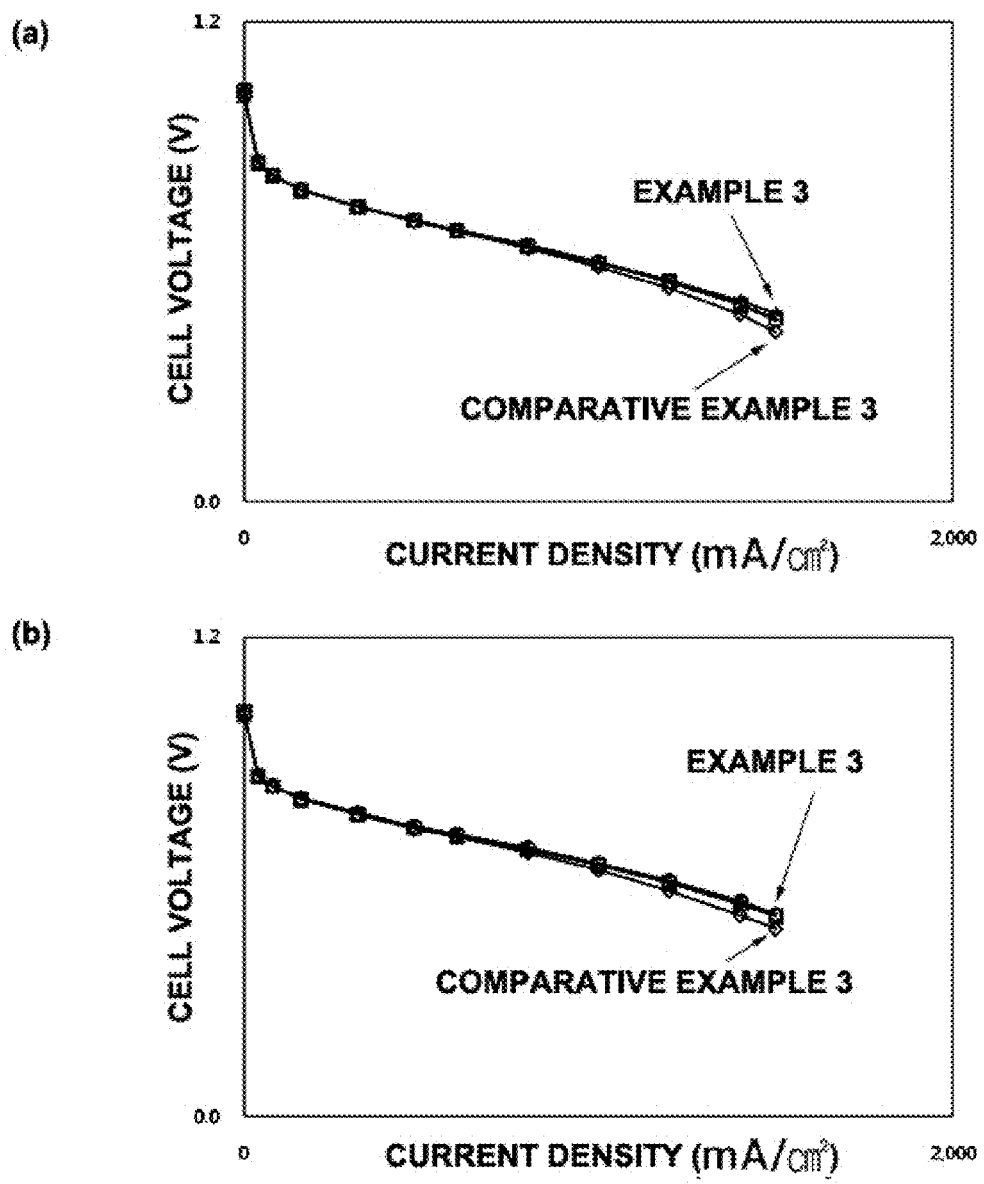
FIG. 10 is a graph showing the electrochemical performances of 5-cell stacks (BP-1) having gas diffusion layers (GDL-1) cut at angles of 0°, 45°, 60°, and 90°, in which (a) was measured at a relative humidity of 50%/50% and (b) was measured at a relative humidity of 100%/100%.

Moreover, the effect of the improvement in the fuel cell performance of the gas diffusion layers GDL-1 cut at angles of 0°, 45°, 60°, and 90° was evaluated, and the results are shown in FIG. 10. As shown in the figure, it can be seen that the fuel cell performances of the gas diffusion layers cut at angles of more than 45° were improved to a level equivalent to that of the gas diffusion layer cut at an angle of 90° at all relative humidities of 50%/50% and 100%/100%.

Therefore, when the process of cutting the GDL material in accordance with the present invention is employed, it is possible to easily manufacture the gas diffusion layer with improved bending stiffness which can prevent the GDL intrusion into the major flow field of the bipolar plate without modifying the existing method for manufacturing the gas diffusion layer, thereby improving the fuel cell performance.

Figure 11:
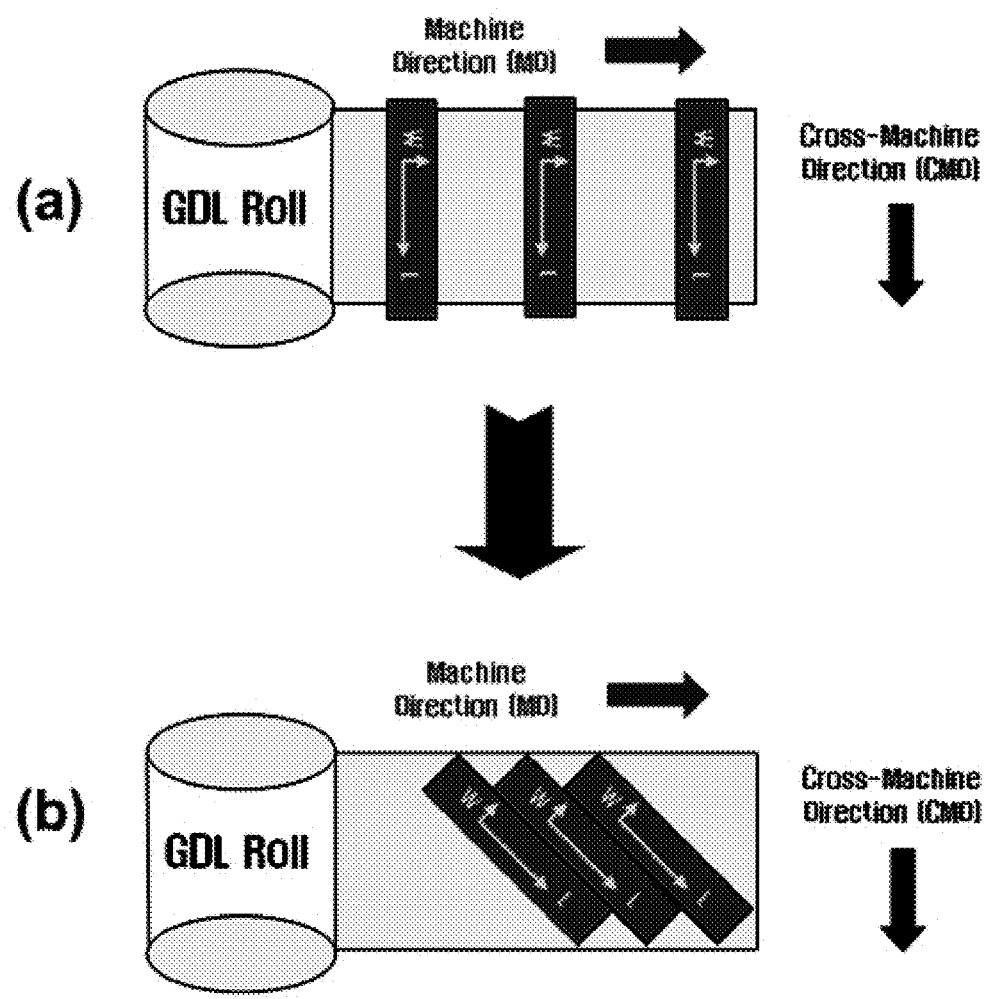
FIG. 11 is a schematic diagram showing a method for manufacturing a gas diffusion layer using a process of cutting a GDL material of the present invention when the width of a rolled GDL material is smaller than the size of the gas diffusion layer, in which (a) shows a prior art method and (b) shows the method of the present invention.

Especially, as shown in FIG. 11, when the width of the rolled GDL material is small or when the length of the gas diffusion layer is relatively large, it is difficult to manufacture the gas diffusion layer having a desired size with the prior art method; however, when the method of the present invention is applied, it is possible to easily manufacture the gas diffusion layer having a size suitable for the desired use by cutting the GDL material at various angles (e.g., 45°, 60°, etc.).

As described above, the present invention provides the following effects.

According to the present invention, it is possible to improve the fuel cell performance by changing the process of cutting the GDL material to increase the bending stiffness of the gas diffusion layer, which is closely related with the GDL intrusion into the flow field channels of the bipolar plate, without modifying the existing method for manufacturing the gas diffusion layer.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell, comprising:
   a polymer electrolyte membrane having two side surfaces, wherein each side surface includes:
   a catalyst layer coated on the side surface of the polymer electrolyte membrane,
   a compressible gas diffusion layer (GDL) stacked on the catalyst layer; and
   a bipolar plate on the compressible GDL and comprises a major flow field and a minor flow field,
   wherein the compressible GDL comprises a dual layer structure including a microporous layer having a pore size of less than 1 μm when measured by mercury intrusion, the microporous layer composed of the mixture of carbon powder and a hydrophobic agent; and a macroporous substrate having a pore size of 1 to 300 μm, the macroporous substrate composed of carbon fiber and a hydrophobic agent, and the compressible GDL has a width direction perpendicular to a major flow field direction of the bipolar plate and a length direction which is in parallel with the major flow field direction of the bipolar plate, and
   wherein the compressible GDL is prepared by cutting a rolled GDL material at a certain angle in a range of 60°≤θ<90° with respect to a machine direction of the rolled GDL material as determined by the major flow field direction of the bipolar plate, such that a high stiffness direction of the compressible GDL as the machine direction of the rolled GDL material is not parallel with the length direction of the compressible GDL, the machine direction of the rolled GDL material is the high stiffness direction of the compressible GDL,
   wherein the high stiffness direction of the compressible GDL as the machine direction of the rolled GDL material is arranged in one direction, the high stiffness direction of the compressible GDL as the machine direction of the rolled GDL material is not parallel with the length direction of the compressible GDL at an angle (θ) in a range of 60°≤θ<90°, formed by the high stiffness direction of the compressible GDL and the length direction of the compressible GDL and, at the same time, with the major flow field direction of the bipolar plate when the compressible GDL is stacked on the bipolar plate to reduce intrusion of the compressible GDL into flow field channels of the bipolar plate.

2. A fuel cell, comprising:
   a polymer electrolyte membrane having two side surfaces, wherein each side surface includes:
   a catalyst layers coated on the side surface of the polymer electrolyte membrane,
   compressible gas diffusion layers (GDL) stacked on the catalyst layers; and
   bipolar plates on the compressible GDL and comprises a major flow field and a minor flow field,
   wherein the compressible GDL comprises a dual layer structure including a microporous layer having a pore size of less than 1 μm when measured by mercury intrusion, the microporous layer composed of the mixture of carbon powder and a hydrophobic agent ; and a macroporous substrate having a pore size of 1 to 300 μm, the macroporous substrate composed of carbon fiber and a hydrophobic agent, and the compressible the GDL has a width direction perpendicular to a major flow field direction of the bipolar plate and a length direction which is in parallel with the major flow field direction of the bipolar plate, and
   wherein the compressible GDL is prepared by cutting a rolled GDL material at a certain angle in a range of 60°≤θ<90° with respect to a machine direction of the rolled GDL material as determined by the major flow field direction of the bipolar plate, such that a high stiffness direction of the compressible GDL as the machine direction of the rolled GDL material is not parallel with the length direction of the compressible GDL, the machine direction of the rolled GDL material is the high stiffness direction of the compressible GDL,
   wherein the high stiffness direction of the compressible GDL as the machine direction of the rolled GDL material is arranged in one direction, the high stiffness direction of the compressible GDL as the machine direction of the rolled GDL material is not parallel with the length direction of the compressible GDL at an angle (θ) in a range of 60≤θ<90, formed by the high stiffness direction of the compressible GDL and the length direction of the compressible GDL, and, at the same time, with the major flow field direction of the bipolar plate when the compressible GDL is stacked on the bipolar plate to reduce intrusion of the compressible GDL into flow field channels of the bipolar plate,
   wherein the rolled GDL material in the machine direction has a Taber bending stiffness in a range of 20 to 150 $g_f$·cm prior to cutting.

3. The fuel cell of claim 1, wherein the GDL has a gas permeability of more than 0.5 cm$^3$/(cm$^2$·s).

4. The fuel cell of claim 1, wherein the compressible GDL has a gas permeability of more than 2.5 cm$^3$/(cm$^2$·s).

5. A fuel cell comprising:
   a polymer electrolyte membrane having two side surfaces, wherein each side surface includes:
   a catalyst layer coated on the side of the polymer electrolyte membrane;
   a compressible gas diffusion layer (GDL) attached to an outer surface of the catalyst layer; and
   a bipolar plate stacked to an outer surface of the compressible GDL wherein the bipolar plate is composed of a major flow field and a minor flow field,
   wherein the major flow field is longer in length than the minor flow field, and the compressible GDL has a width direction perpendicular to a major flow field direction of the bipolar plate and a length direction which is in parallel with the major flow field direction of the bipolar plate,
   wherein the compressible GDL has a dual layer structure including a microporous layer composed of the mixture of carbon powder and a hydrophobic agent and a macroporous substrate composed of carbon fiber and a hydrophobic agent, and the bipolar plate is stacked on the macroporous substrate of the gas diffusion layers, wherein the compressible GDL is prepared by cutting a rolled GDL material at a certain angle with respect to a machine direction of the rolled GDL material such that the machine direction of the GDL material is not parallel with the length direction of the compressible GDL, the machine direction of the GDL material is a high stiffness direction of the compressible GDL, wherein the high stiffness direction of the compressible GDL as the machine direction of the rolled GDL material is arranged in one direction, the high stiffness direction of the compressible GDL is at an angle in a range of $60° \leq \theta < 90°$ with respect to the length direction of the compressible GDL such that the high stiffness direction of the compressible GDL as the machine direction of the rolled GDL material is not parallel with the major flow field direction of the bipolar plate when the compressible GDL is stacked on the bipolar plate to reduce intrusion of the compressible GDL into flow field channels of the bipolar plate.

6. The fuel cell of claim 5, wherein each of the compressible GDLs has a gas permeability of more than 0.5 $cm^3/(cm^2 \cdot s)$.

7. The fuel cell of claim 5, wherein each of the compressible GDLs has a gas permeability of more than 2.5 $cm^3/(cm^2 \cdot s)$.

8. A fuel cell, comprising:
a polymer electrolyte membrane having two side surfaces, each side surface comprises:
a catalyst layer coated on each side surface of the polymer electrolyte membrane,
a compressible gas diffusion layer (GDL) stacked on each of the of the catalyst layer; and
a bipolar plate stacked on each of the compressible GDL and comprises a major flow field and a minor flow field, wherein the compressible GDL comprises a dual layer structure including a microporous layer having a pore size of less than 1 μm when measured by mercury intrusion, the microporous layer composed of the mixture of carbon powder and a hydrophobic agent; and a macroporous substrate having a pore size of 1 to 300 μm, the macroporous substrate composed of carbon fiber and a hydrophobic agent, and the compressible GDL has a width direction perpendicular to a major flow field direction of the bipolar plate and a length direction which is in parallel with the major flow field direction of the bipolar plate, and wherein the compressible GDL is prepared by cutting a rolled GDL material at a certain angle in a range of $60° \leq \theta < 90°$ with respect to a machine direction of the rolled GDL material as determined by the major flow field direction of the bipolar plate, such that a high stiffness direction of the compressible GDL as the machine direction of the rolled GDL material is not parallel with the length direction of the compressible GDL at an angle ($\theta$) in a range of $60° \leq \theta < 90°$, formed by the high stiffness direction of the compressible GDL and the length direction of the compressible GDL, the machine direction of the rolled GDL material is the high stiffness direction of the compressible GDL, wherein the high stiffness direction of the compressible GDL as the machine direction of the rolled GDL material is arranged in one direction, the high stiffness direction of the macroporous substrate of the compressible GDL as the machine direction of the rolled GDL material is not parallel with the length direction of the macrosubstrate substrate of the compressible GDL and, at the same time, with the major flow field direction of the bipolar plate when the compressible GDL is stacked on the bipolar plate to reduce intrusion of the compressible GDL into flow field channels of the bipolar plate.

* * * * *